April 28, 1931.  C. H. TANNER  1,802,683

METHOD OF AND APPARATUS FOR ELIMINATING FROST IN AIR LINES

Filed Feb. 18, 1928

Charles H. Tanner Inventor by Barton A. Beau Jr.
Attorney

Patented Apr. 28, 1931

1,802,683

UNITED STATES PATENT OFFICE

CHARLES H. TANNER, OF ST. CLOUD, MINNESOTA

METHOD OF AND APPARATUS FOR ELIMINATING FROST IN AIR LINES

Application filed February 18, 1928. Serial No. 255,485.

This invention relates to compressed air apparatus and has special reference to a method of and apparatus for preventing the formation of frost in pipes, commonly called air lines, conveying compressed air to tools and thereby preventing such air lines from becoming clogged by freezing.

It is a well known fact that whenever atmospheric air is compressed, the moisture content is retained and, in pipes exposed to freezing temperatures, this moisture content is frequently sufficiently high as to be deposited as frost or ice preventing the air from flowing through the pipes. Also such freezing of the moisture is apt to burst the pipes and the tools damaged.

The important object of the present invention contemplates the provision of improved, simple and economical means which will effectively prevent freezing of moisture in compressed air flowing into or through an air line, thus eliminating danger of damage to piping and tools from this cause.

Certain objects of the invention are attained by the provision of a liquid container and means inside of the liquid container for carrying the air into proximity with the surface of the liquid and for changing and adjusting the direction of the flow of the air against the side of the tank or against the surface of the liquid to regulate the amount of vapors mixed with the air.

Other objects are attained by the provision of means for agitating the liquid in the container by the introduction of the air to be treated into the tank, and to accomplish this end, the air pipe leading to the liquid within the container is made in the form of a spiral to permit the use of a long length of pipe and to permit it to vibrate more readily as the air leaves it and strikes the wall of the tank or the surface of the liquid. The air leaves the pipe through an adjustable nozzle so that the direction of the air may be changed and the amount of vibration of the pipe and the resultant vibration of the tank changed to increase the agitation of the liquid and the consequent evolution of vapors therefrom.

A further important object of the invention is the provision of a frost eliminator wherein an air stream may be directed across the surface of a liquid which gives off antifreeze and frost destroying vapors.

With the above and other objects in view as will be hereinafter apparent, the invention consists in general of certain novel details of construction and combinations of parts hereinafter fully described, illustrated in the accompanying drawings and specifically claimed.

In the accompanying drawings, like characters of reference indicate like parts in the several views, and:

Figure 1:
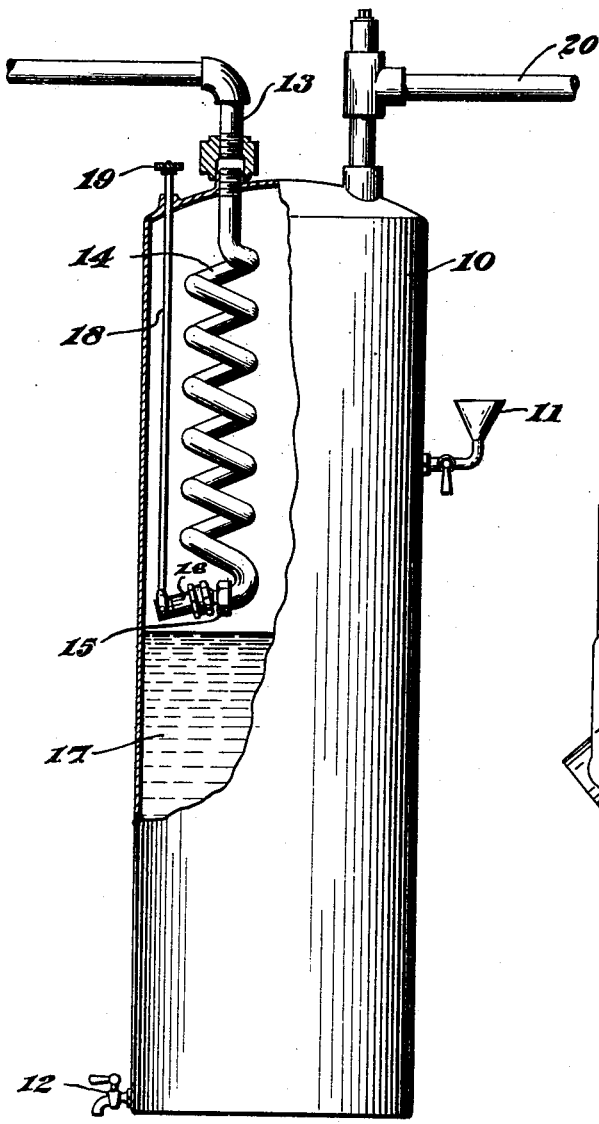
Fig. 1 is a vertical section through a frost eliminator constructed in accordance with this invention.
Figure 2:
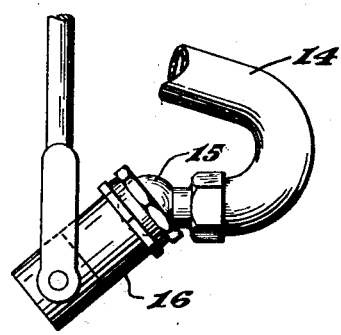
Fig. 2 is an enlarged detail view of the lower end of the air supply delivery pipe.

In the embodiment of the invention herein disclosed, there is provided a vertical cylindrical tank 10 closed at both top and bottom by suitable heads. This tank may be provided with a valve filling inlet 11 for the supply of the vapor producing liquid and may also have a suitable drain cock 12. Connected to the top of the tank is a supply pipe 13 which is intended to be connected to a compressed air tank wherein the air may be compressed by any suitable pumping means. The pipe 13 communicates with a spiral delivery pipe 14, connected to the tank, on the lower end of which is carried a ball and socket pipe joint 15 provided with a delivery nozzle 16 by means of which the air issuing from the pipe 14 may be delivered in varying directions within the tank 10 against the wall of the tank or the surface of the liquid as desired. This nozzle is located just above the normal surface 17 of the liquid which is held in the lower part of the tank and the position of the nozzle is controlled by means of a valve rod 18 passing up through the top of the tank 10 and provided with a manipulating handle 19. By this means, the nozzle may be pushed up or down and may also be swung from side to side.

This adjustment of the nozzle permits the stream of air to be directed against the walls of the tank or against the surface of the liquid at any angle of inclination to agitate it by substantially direct vertical contact or by causing it to whirl in the tank to increase the emission of gas from the liquid. The spiral shape of the delivery pipe 14 permits of the use of a large length of pipe providing considerable weight of material freely vibratory so that the outgoing air will effectually vibrate the tank to agitate the liquid as it sets up vibration in the delivery pipe.

Leading out of the top of the tank 10 is a draw-off pipe 20 which may be connected to any air-operated tool.

The frost eliminating liquid employed in the tank 10, preferably consists of a mixture of denatured alcohol or other alcohols and an aqueous solution containing a considerable concentration of calcium chlorid or other alkaline or alkaline earth compounds such as compounds of the sodium, ammonium or calcium groups.

By means of this construction, the entering air effectually vibrates the delivery pipe 14 and through it the tank thereby agitating the liquid to cause a rapid evolution of vapors from the liquid and to properly mix them with the air, thereby keeping the pipe 20 and the tool connected to the pipe from freezing up, it being noted that the vapor will also melt the ice if there is any in the line or tool. Naturally by varying the angle of the delivery nozzle the degree of agitation of the liquid may be regulated with the consequence that the proper quantities of vapors may be controlled.

The device shown is essentially a frost preventing and eliminating means. By passing the air over the liquid instead of through it, and by the provision of the adjustable nozzle, it is obvious that the amount of liquid used can be readily controlled according to temperature demands.

Having thus described the invention, what is claimed as new is:

1. In a frost eliminator for air lines, a closed tank adapted to be partially filled with a vapor emitting liquid, an inlet pipe extending downwardly through the top of said tank, a delivery nozzle at the lower end of said pipe and having a ball and socket connection therewith, said nozzle being located slightly above normal level of the liquid in the tank, a draw-off pipe leading from the top of the tank, and means controllable from the exterior of the tank for governing the position of the delivery nozzle.

2. In a frost eliminator for air lines, a closed tank adapted to be partially filled with a vapor emitting liquid, an inlet pipe extending downwardly through the top of said tank, a delivery nozzle at the lower end of said pipe and having a ball and socket connection therewith, said nozzle being located slightly above the normal level of the liquid in the tank, a draw-off pipe leading from the top of the tank, a controlling rod having its lower end connected to the movable part of the ball and socket joint and having its upper end extending through the top of said tank, and a manipulating handle on the upper end of said rod.

3. In a frost eliminator for air lines, a closed tank adapted to be partially filled with a vapor emitting liquid, an inlet pipe extending downwardly through the top of said tank, a delivery nozzle at the lower end of said pipe and having a ball and socket connection therewith, said nozzle being located slightly above the normal level of the liquid in the tank, a draw-off pipe leading from the top of the tank, and means controllable from the exterior of the tank for governing the position of the delivery nozzle, said inlet pipe being coiled within the tank to form a spiral and the delivery nozzle being at the bottom end of said spiral.

4. In a frost eliminator for air lines, a closed tank adapted to be partially filled with a vapor emitting liquid, an inlet pipe extending downwardly through the top of said tank, a delivery nozzle at the lower end of said pipe and having a ball and socket connection therewith, said nozzle being located slightly above the normal level of the liquid in the tank, a draw-off pipe leading from the top of the tank, a controlling rod having its lower end connected to the movable part of the ball and socket joint and having its upper end extending through the top of said tank, and a manipulating handle on the upper end of said rod, said inlet pipe being coiled within the tank to form a spiral and the delivery nozzle being at the bottom end of said spiral.

5. In a frost eliminator, a tank containing a liquid volatile under working temperatures, an air pressure line secured to the tank, and an air delivery means located within the tank and secured thereto in conduit relation with said air pressure line and constructed to vibrate upon passage of air therethrough.

6. In an air and gas mixing apparatus, a container holding a vapor emitting liquid, a spiral air delivery tube within the container and suspended therefrom, and means for passing air through said tube.

7. In an air and gas mixing apparatus, a container holding a vapor emitting liquid, a spiral air delivery tube within the container and suspended therefrom, an adjustable nozzle on the free end of said tube, and means for passing air through said tube.

8. In combination with a tank containing a vapor emitting liquid, means for delivering compressed air within the tank comprising a device vibrated by the passage of air therethrough, and an operative connection between said device and tank to cause the vibration of said device to be communicated to the tank.

9. The method of preventing the freezing of the moisture of condensation in air lines which comprises, mixing an alcohol and an aqueous solution containing a substantial amount of an alkaline compound, agitating the mixture thus formed to accelerate the rate of vaporization of the volatile portion thereof and introducing the vapor thus obtained into an air line.

10. The method of preventing the freezing of the moisture of condensation in air lines which comprises mixing denatured alcohol and an aqueous solution containing a substantial amount of a calcium compound, agitating the mixture thus formed to accelerate the rate of vaporization of the volatile portion thereof and introducing the vapor thus obtained into an air line.

11. The method of preventing the freezing of the moisture of condensation in air lines which comprises directing air under pressure and prior to its passage into an air line into the proximity of a body of liquid containing a mixture of alcohol and an aqueous solution containing a substantial amount of an alkaline compound, and agitating the liquid to accelerate the rate of vaporization of the volatile portion of said liquid and the admixture thereof with said air.

12. The method of preventing the freezing of the moisture of condensation in air lines which comprises directing air under pressure and prior to its passage into an air line into the proximity of a body of liquid containing a mixture of denatured alcohol and an aqueous solution containing a substantial amount of a calcium compound, and agitating the liquid to accelerate the rate of vaporization of the volatile portion of said liquid and the admixture thereof with said air.

CHARLES H. TANNER.

CERTIFICATE OF CORRECTION.

Patent No. 1,802,683.   Granted April 28, 1931, to

CHARLES H. TANNER.

It is hereby certified that error appears in the printed specification of the above numbered patent requiring correction as follows: Page 1, line 17, strike out the words "important object of the"; and that the said Letters Patent should be read with this correction therein that the same may conform to the record of the case in the Patent Office.

Signed and sealed this 2nd day of June, A. D. 1931.

(Seal)

M. J. Moore,
Acting Commissioner of Patents.